May 16, 1950     C. S. ASH     2,507,876
DUAL WHEEL
Filed July 28, 1945     3 Sheets-Sheet 1
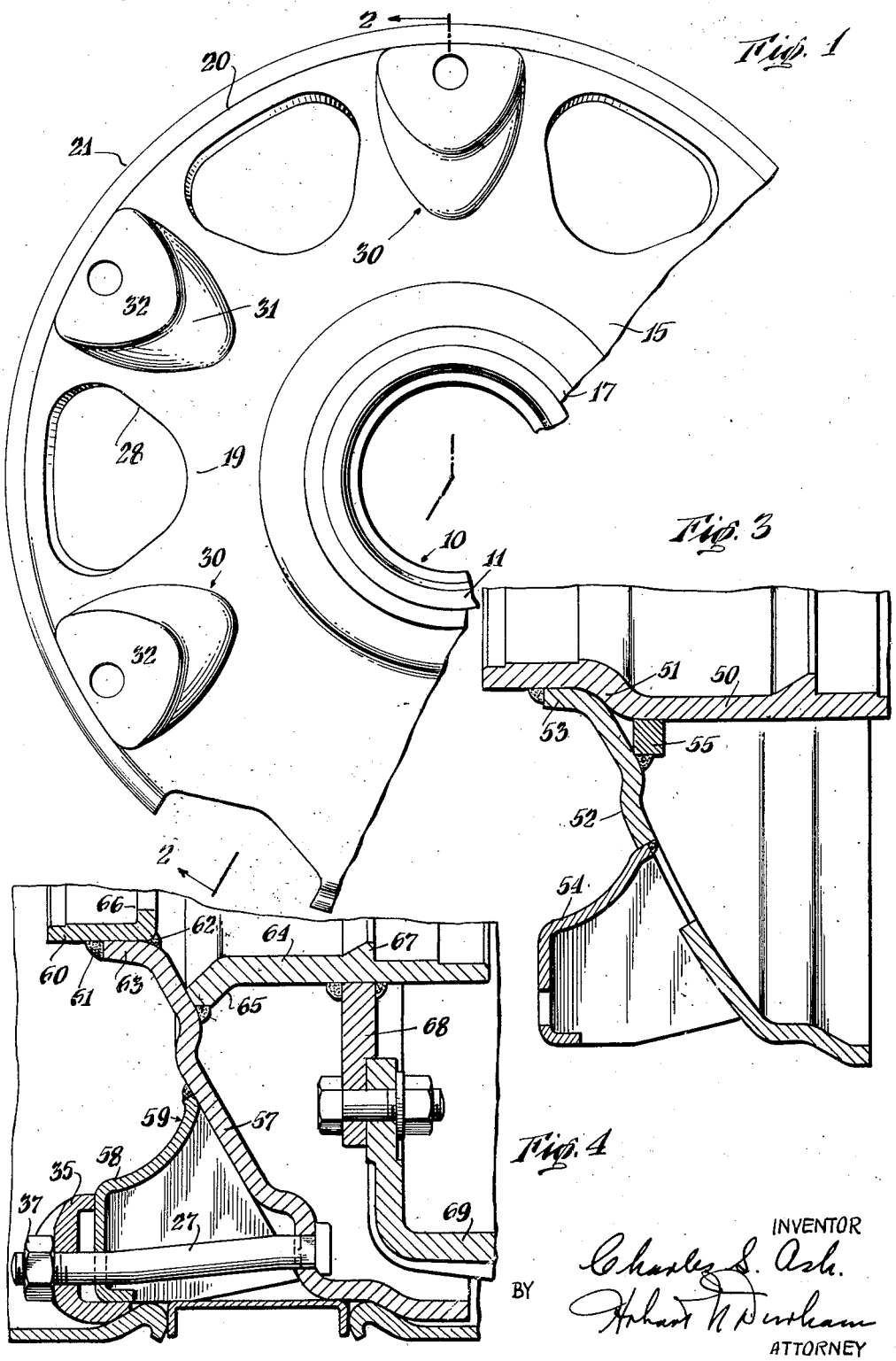

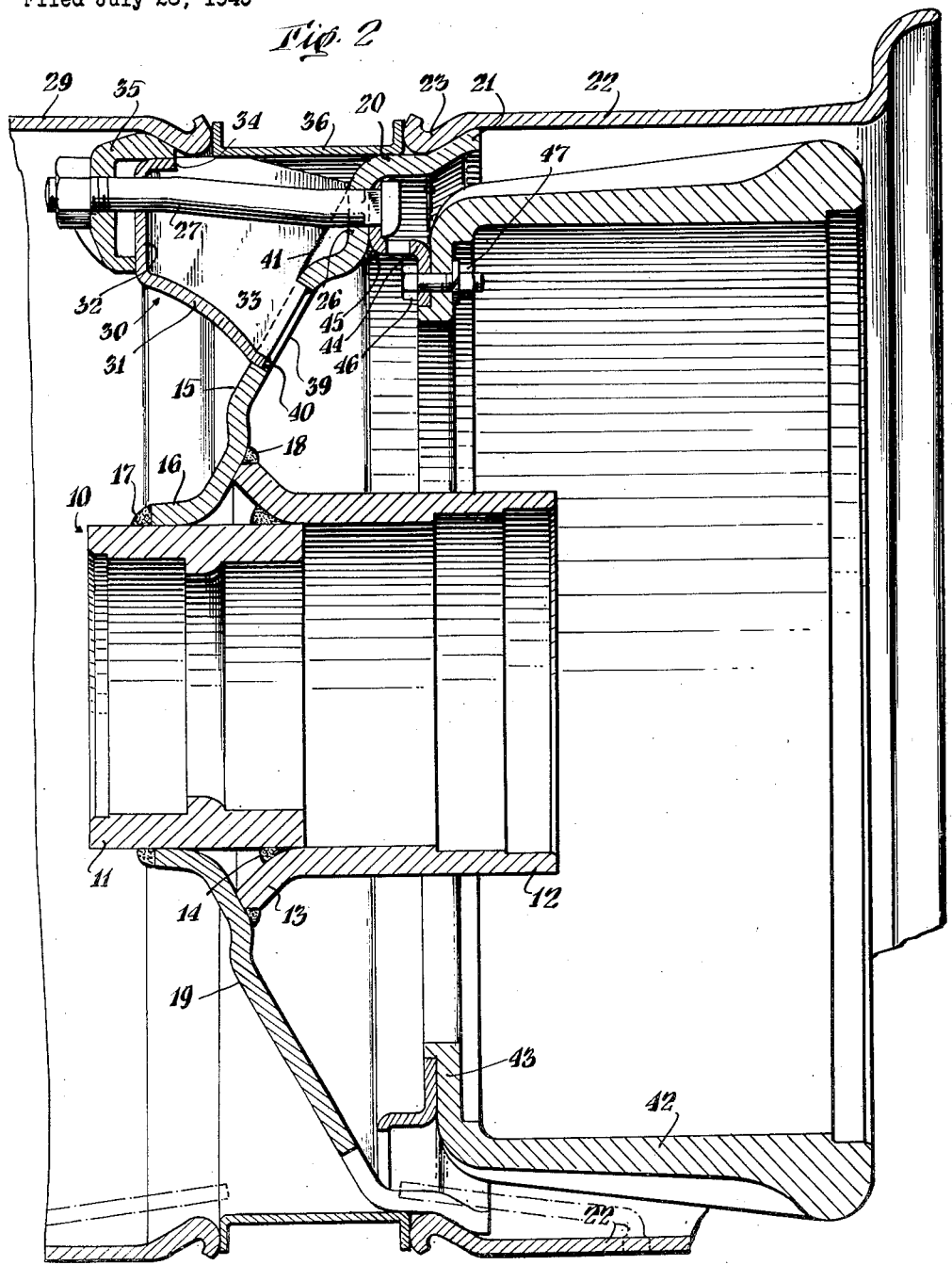

Patented May 16, 1950

2,507,876

UNITED STATES PATENT OFFICE 2,507,876

DUAL WHEEL

Charles S. Ash, Milford, Mich.

Application July 28, 1945, Serial No. 607,597

3 Claims. (Cl. 301—13)

The present invention relates to vehicle wheels and more particularly to wheels adapted to carry a plurality of road engaging elements.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 1 is a fragmentary side elevational view of a typical and illustrative embodiment of the present invention looking inwardly at the wheel;

Fig. 2 is a cross-sectional view taken along line 2—2 of Fig. 1;

Fig. 3 is a fragmentary cross-sectional view of a modified embodiment of the present invention;

Fig. 4 is a fragmentary cross-sectional view of a third embodiment of the present invention;

Figure 5:
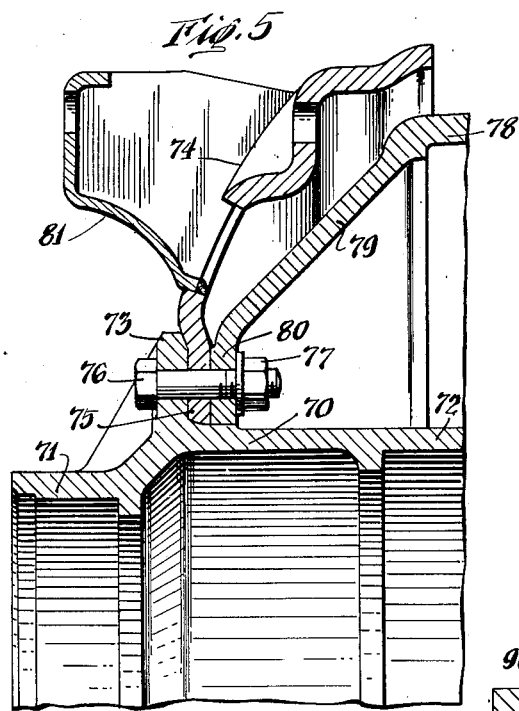
Fig. 5 is a fragmentary cross-sectional view of still another embodiment of the invention.

The present invention has for an object the provision of an improved wheel of a heavy-duty type suitable for use on trucks, trailers and similar vehicles where the mounting of dual tires is desirable or essential. Another object of the invention is the provision of a safe and sturdy vehicle wheel adapted to carry a pair of demountably mounted pneumatic tire rims. The invention further provides a dual-tire carrying wheel which is at the same time strong and balanced in construction but relatively light in design. Still another object is the provision of a dual-tire carrying wheel which is a strong composite structure of a plurality of relatively simply made preformed parts, effecting a substantial saving in fabrication costs for the finished vehicle wheel.

Referring now in detail to the illustrative embodiments of the invention shown by way of example in the accompanying drawings, and referring first to the embodiments of Figs. 1 and 2, the vehicle wheel comprises a two part hub indicated generally by the reference numeral 10. The hub is formed of an outer cylindrical portion 11 and an inner longer cylindrical portion 12. The outer diameter of the hub portion 11 is substantially equal to the inner diameter of the portion 12 and the outer end of the latter portion is outwardly flared as indicated at 13. In making the wheel the hub portions 11 and 12 are prefabricated in any suitable manner and the outer hub portion is then inserted in the outer end of the inner hub portion and the two are securely joined together by a circular weld 14 within the flared end 13 of the inner hub.

The dual tire carrying portion of the wheel comprises a web 15 which has at its inner periphery an outwardly turned cylindrical portion 16 which is securely welded toward the outer end of hub portion 11 as indicated at 17. As clearly shown in Fig. 2 of the drawings, web 15 is inwardly dished or curved in its radial width adjacent its inner peripheral portion 16 and contacts the inclined end of the inner hub portion 12, the flared part 13 of this hub portion thus forming a support for the web. The web and hub portion 12 are secured together by a circular weld 18.

Directly radially outwardly of weld 18 web 15 extends for a short distance in a plane substantially normal to the axis of the hub, and beyond that it is formed in a frusto-conical portion 19 which is flared axially inwardly of the wheel assembly. At the radially outer edge of frusto-conical portion 19 the web curves further axially inwardly in a substantially cylindrical periphery 20 which is flared at its inner end to provide an inclined outer surface 21. The cylindrical outer periphery 20 of the web forms a seat for a pneumatic tire rim 22 of a conventional type, the inclined surface 21 providing a seat for the edge bead 23 of the rim.

At a plurality of circumferentially spaced apart places the wheel web 15 in its frusto-conical portion 19 is flattened to form portions 26 which are substantially normal to the axis of rotation of the wheel. The portions 26 are apertured to receive rim mounting bolts 27 which demountably mount the dual rims, as hereinafter pointed out. The frusto-conical portion 19 of the web may have a relatively large aperture as indicated by the numeral 28 between each flattened portion 26 in order to lighten the wheel.

Means are provided for mounting another tire rim 29 beside the inner rim 22 on the wheel web 15, and as shown comprise a plurality of spaced apart spoke members 30 secured to the web. The spoke members 30 are generally in the form of open-topped boxes, having inclined bottom webs 31, end webs 32 lying in a plane substantially normal to the wheel axis, and side webs 33 integrally formed with the portions just mentioned. The end web 32 terminates at its top with an inwardly turned portion 34 which forms a plane seat for a lug 35 on bolt 27 whereby the outer rim 29 is held in place supported by spoke members 30. The lower projections of lug 35 seat on the outer faces of end webs 32 of the spoke members. A cylindrical spacing ring 36 separates the preferably duplicate rims 22 and 29, and nuts on the ends of bolts 27 complete the demountable mounting of the rims.

Referring again to the spoke members 30, it may be seen in Fig. 1 of the drawings that the side webs 33 of each member are inclined so that they converge and join at the bottom of the member in a smooth curve, and the end web 32 of each member is similarly formed. In order to securely mount the spoke members 30 on web 15 the latter is provided with a plurality of apertures indicated 39 in Fig. 2 of the drawings each having an outline to snugly receive the curved bottom of a spoke member 30 where the webs 33 and 31 converge and meet. The spoke members are securely welded in apertures 39 by welding 40, and are further welded as at 41 along the edges of side webs 33 where they abut the wheel web 15.

It will be seen from the foregoing description that there has been provided a light weight, strong vehicle wheel adapted to demountably carry dual rims, and that the wheel is formed of relatively few and easily prefabricated parts. The single web 15 along mounts the dual rims with the cooperation of the outwardly axially extending spoke members 30, and the essential portions of the permanent wheel body as have been described, elements 11, 12, 15 and 30, may expeditiously be separately made and welded together.

The braking means for the wheel shown in Figs. 1 and 2 of the drawings include a cylindrical brake drum 42 positioned at the inner side of web 15 for cooperation with any suitable and conventional frictional means (not shown). Brake drum 42 is provided with an inwardly radially extending flange portion 43 at its outer end by which it is held to wheel web 39 by means of an annular, S-curved, connecting ring 44. Ring 44 is securely welded to web 30 as indicated at 45, being further held thereto by bolts 27 when the rims are assembled, and is connected to flange 43 of drum 42 by a plurality of bolts 46 and nuts 47.

The embodiment of the present invention shown in Fig. 3 is somewhat different than that just discussed, it showing the use of a unitary hub in combination with the single wheel web and spoke construction. The hub member 50 is a single tubular member, being somewhat reduced at its outer end to form a shoulder 51 against which the web 52 is seated at its inner peripheral cylindrical portion 53, which seats on an external surface of the hub. The shape of web 52 is substantially identical to that of web 15 described for the foregoing embodiment of the invention, and the web also carries a plurality of spoke members 54 in order that dual rims may be mounted thereon. The assembly is strengthened in this embodiment by an annular ring 55, which is fitted on the outer cylindrical surface of hub 50 behind web 52, and is securely welded both to the hub and web.

In Fig. 4 of the drawings there is shown an embodiment of the invention wherein a single wheel web and spoke members are utilized to demountably mount dual rims, and the hub for the wheel is of two piece construction integrated through a portion of the wheel web. As shown in the drawing, the wheel web 57 is similarly formed to those of the first two embodiments of the invention already described, and a plurality of spaced outwardly radially extending spoke members 58 are separately fabricated and welded to the web. The web and spoke assembly differs somewhat from the foregoing embodiments of the invention in that the lower web 59 of the spoke is radially inwardly curved so as to flatly abut the outer surface of the frusto-conical portion of the wheel web and is welded thereto. In this embodiment no apertures are provided in wheel web 57 to receive the spoke members 58, but the members are securely welded together at their contacting portions.

In the embodiment of Fig. 4 the hub for the wheel comprises an outer relatively short hub portion which is securely welded as at 61 and 62 to the peripheral cylindrical portion 63 of the web. Another longer, inner hub portion 64 is made with an outer flared end 65 at which it is welded to an inclined portion of the wheel web adjacent the inner periphery of the latter. The hub portions 60 and 64 are formed for the reception and retention of suitable anti-friction bearings for rotatably mounting the wheel on an axle end, portion 60 being formed with a flange 66 and portion 64 with an internal shoulder 67 as bearing seats.

Braking means for this embodiment of the invention comprises an annular flange 68 securely welded centrally of the hub portion 64, and to the flange is connected a cylindrical brake drum 69 by means of suitable bolts and nuts.

The embodiment of the invention shown in Fig. 5 of the drawings comprises a tubular one piece hub member 70 having internal bearing seats at 71 and 72 and an external outwardly radially extending integral flange 73. The web 74 of the wheel has an annular portion 75 adjacent its inner periphery which lies in a plane substantially normal to the axis of the hub 70, and radially outwardly thereof the web generally has the same configuration as the webs described for the foregoing embodiments of the invention. The plane portion 75 of the wheel web abuts the inner surface of flange 73 and is firmly held thereto by bolts 76 and cooperating nuts 77. Also held to flange 73 in the same manner for correlative rotation with the hub 70 is a brake drum 78 having a frusto-conical portion 79 terminating in a flange 80 which abuts the inner surface of plane portion 75 of wheel web 74. The web is provided with a plurality of spoke members 81 associated therewith as in the embodiment of the invention shown in Figs. 1 and 2 already described.

Figure 6:
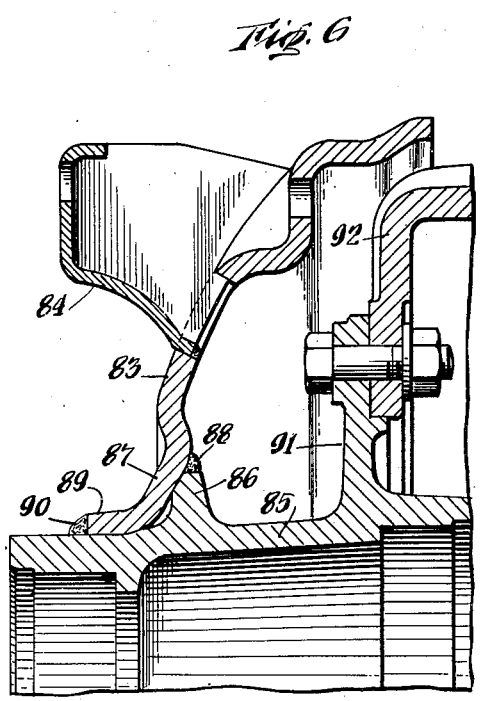
Fig. 6 is a fragmentary cross-sectional view of a further modification of the present invention.

Fig. 6 of the drawings shows a further embodiment of the invention in which the wheel web 83 and spoke members 84 are substantially identical with the corresponding assembly in the embodiment shown in the first two figures of the drawings. The hub 85 of this embodiment has an integral outwardly radially extending flange 86 against which the inclined portion 87 of web 83 bears. The web is welded to the hub as by a circular weld 88 between its portion 87 and flange 86, and also between its peripheral cylindrical portion 89 which seats on the hub, and the outer surface of the hub, as indicated at 90.

In this embodiment of the invention hub 85 has another integral annular flange 91 adjacent its inner end to which is secured a cylindrical brake drum 92.

Figure 7:
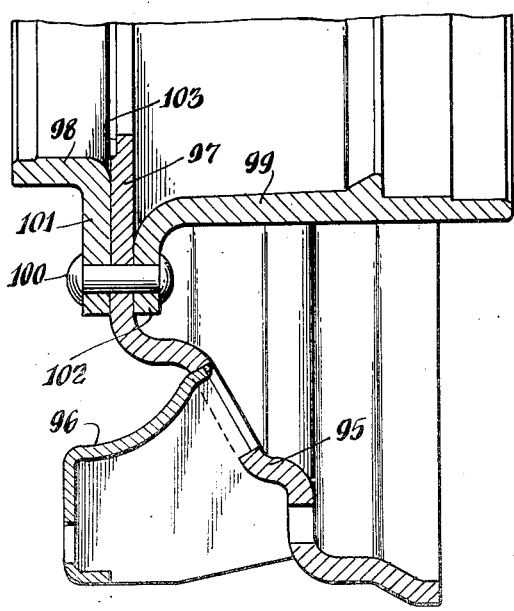
Fig. 7 is a fragmentary cross-sectional view of a sixth embodiment of the invention.

A further embodiment of the invention shown in Fig. 7 comprises a wheel web 95 and spoke members 96 formed substantially as the embodiment of Figs. 1 and 2. In this embodiment, however, the web 95 terminates at its inner periphery in a plane portion 97 which is substantially normal to the axis of the wheel and of substantial radial width. An outer hub portion 98 and an inner hub portion 99 are secured to opposite surfaces of plane portion 97 of the web by means of rivets 100 or other suitable equivalent means through their respective outwardly radially extending end flanges 101 and 102 which abut the portion 97. The inner periphery of the web 95 is formed as indicated at 103 as a shoulder for the anti-friction bearing of the outer hub portion 98.

The invention in its broader aspects is not limited to the specific mechanisms shown and described but departures may be made therefrom within the scope of the accompanying claims without departing from the principles of the invention and without sacrificing its chief advantages.

What I claim is:

1. A vehicle wheel comprising, in combination, a hub, a wheel web secured at its inner periphery to said hub, and a plurality of outwardly axially extending spoke members secured to said wheel web, said members each comprising a front web substantially normal to the axis of the hub, a pair of side webs secured to the edges of the front web and converging on each other at their lower portions and joining in a lower web, said lower web being radially inwardly curved between said front web and the wheel web, said side and lower webs seating in arcuate apertures in said wheel web and being secured therein.

2. A vehicle wheel comprising, in combination, a first tubular hub element having an enlarged end, a second tubular hub element positioned in said enlarged end and secured thereto, a wheel web secured at its inner periphery to said second element and being axially inwardly inclined and abutting said enlarged end of said first element, and means for demountably mounting a pair of road engaging elements on said wheel web.

3. A vehicle wheel comprising, in combination, a hub, a wheel web secured at its inner periphery to said hub, a plurality of outwardly axially extending hollow spoke members seated in apertures in said wheel web and secured therein, and means for removably mounting a rim on said web and a second rim on said members.

CHARLES S. ASH.

REFERENCES CITED

The following references are of record in the file of this patent:

UNITED STATES PATENTS

| Number | Name | Date |
|---|---|---|
| 1,448,144 | Moore | Mar. 13, 1923 |
| 1,478,493 | Walkley | Dec. 25, 1923 |
| 1,555,137 | Main et al. | Sept. 29, 1925 |
| 1,612,050 | Putnam | Dec. 28, 1926 |
| 1,619,607 | Fairweather | Mar. 1, 1927 |
| 1,703,714 | Booth | Feb. 26, 1929 |
| 1,761,928 | Main | June 3, 1930 |
| 1,769,296 | Klaus | July 1, 1930 |
| 1,849,650 | Walther | Mar. 15, 1932 |
| 1,895,499 | Stough | Jan. 31, 1933 |
| 2,022,153 | Rogers | Nov. 26, 1935 |
| 2,027,408 | Walther | Jan. 14, 1936 |
| 2,041,996 | Eksergian | May 26, 1936 |
| 2,220,284 | Roemer | Nov. 5, 1940 |
| 2,355,941 | Ash | Aug. 5, 1944 |